United States Patent

[11] 3,560,659

[72] Inventors Johannes Anton Greefkes;
Henricus Petrus Johannes Boudewijns,
Emmasingel, Eindhoven, Netherlands

[21] Appl. No. 757,051
[22] Filed Sept. 3, 1968
[45] Patented Feb. 2, 1971
[73] Assignee U.S. Philips Corporation
New York, N.Y.
a corporation of Delaware. by mesne assignments
[32] Priority Sept. 2, 1967
[33] Netherlands
[31] 6712082

[54] SYSTEM FOR THE TRANSMISSION OF ANALOG SIGNALS BY MEANS OF PULSE CODE MODULATION
17 Claims, 13 Drawing Figs.

[52] U.S. Cl. ........................................................ 179/15, 325/42
[51] Int. Cl. ........................................................ H04j 3/18
[50] Field of Search ........................................... 179/15 (ACE), 15.55, 15 (APC); 325/38.1, 42, 43, 44

[56] References Cited
UNITED STATES PATENTS
2,897,275 7/1959 Bowers ......................179/15UX(ACE)
3,461,244 8/1969 Brolin .......................... 179/15(ACE)

*Primary Examiner*—Ralph D. Blakeslee
*Attorney*—Frank R. Trifari

ABSTRACT: A pulse code modulation system for the transmission of analog signals by converting prior to transmission successive samples of the analog signal supplied by a level signal generator to an analog to digital converter having dynamic high compression feedback control circuits for producing coded groups of pulses having different weights and numbers characterizing the analog signals. After transmission, the coded groups of pulses are supplied to a digital to analog converter, having characteristics reciprocal to those of the transmitter's analogue to digital converter, and a dynamic expansion control circuit, having reciprocal characteristics of the transmitter's compression circuits to produce exact reproductions of the original analog signals.

INVENTORS
JOHANNES A. GREEFKES
HENRICUS P. J. BOUDEWIJNS
BY
Frank R. Trifari
AGENT INVENTORS
JOHANNES A. GREEFKES
HENRICUS P. J. BOUDEWIJNS
BY
Frank R. Trifari
AGENT INVENTORS
JOHANNES A. GREEFKES
HENRICUS P. J. BOUDEWIJNS
BY
Frank R. Trifari
AGENT INVENTORS
JOHANNES A. GREEFKES
HENRICUS P.J. BOUDEWIJNS
BY
Frank R. Trifari
AGENT INVENTORS
JOHANNES A.GREEFKES
HENRICUS P. J.BOUDEWIJNS
BY
Frank R. Trifari
AGENT

SYSTEM FOR THE TRANSMISSION OF ANALOG SIGNALS BY MEANS OF PULSE CODE MODULATION

The invention relates to a system for the transmission of analogue signals by means of pulse modulation and to transmitters and receivers to be used therein; such a transmitter includes an anglogue-to-digital converter which at successive instants converts the value of the analogue signal, measured in coding units, into code groups having a number of pulses of different weights which characterize by their presence or absence the value of the analogue signal in coding units, the transmitter for dynamic compression further including a dynamic control member connected to the analogue-to-digital converter, while the receiver includes a digital-to-analogue converter converting the code groups applied to it into the signal value characterized by these code groups and a dynamic control member for the dynamic expansion connected to the digital-to-analogue converter. This system is used, for example, for the transmission of speech signals, music signals and the like.

In practice, mainly two modes of transmission are employed for pulse-code modulation transmission; with one mode of transmission, the weights of the successive pulses of a code group decrease by a weight factor 2, while with the other mode of transmission, the weights of the successive pulses of a code group increase by a weight factor 2. Thus, with the first mode of transmission, the successive pulses of code groups comprising five pulses characterize in coding units E signal values $2^4$ E, $2^3$ E, $2^2$ E, $2^1$ E, $2^0$ E, while with the second mode of transmission, the successive pulses characterize signal values of $2^0$ E, $2^1$ E, $2^2$ E, $2^3$ E, $2^4$ E. For example, with the first mode of transmission, a signal value of $2^{2}4$ E is characterized by the presence of the first two pulses and with the second mode of transmission by the presence of the last two pulses.

In general, with pulse code modulation, the amplitude quantization results in differences between the signal voltage at the receiver end and the original signal voltage, which differences give rise to the so-called quantization noise; this quantization noise has a disturbing effect especially at a comparatively low signal voltage or at a low signal level, and moreover the transmission of the low signal levels is inaccurate owing to the amplitude quantization. In modern pulse-code modulation transmission systems, dynamic control is employed especially to reduce the harmful effect of the quality of the lower signals levels, the dynamic control members being connected at the transmitter end to the analogue-to-digital converter and at the receiver end to the digital-to-analogue converter, respectively; in modern pulse-code modulation transmission systems, an instantaneous compression- and expansion-control, respectively, is obtained in particular by means of fixed networks having amplitude characteristics the slopes of which vary discontinuously at given signal values (the so-called piecewise linear characteristic).

In order to prevent nonlinear distortions in these known transmission systems, it is required that over the whole control range of, for example, 30 dB the amplitude characteristics of these networks at the transmitter end and at the receiver end should extend accurately reciprocally, while this dynamic control is extremely susceptible to interface in the transmission path, which results in the susceptibility to interference of the whole transmission system being increased. Extensive interference measurement have shown, for example, that a harmful effect on the quality could be clearly observed already with interference chances of $10^{-3}$ or $10^{-2}$.

The invention has for an object to provide a different very simple construction of a transmission system of the kind mentioned in the preamble and of the transmitters and receivers to be used therein, in which the disturbing effect of the quantization noise is considerably reduced by raising the degree of compression and in which despite this high degree of compression the signals to be transmitted are accurately recovered at the receiver end, while furthermore the susceptibility to interference is reduced and the occurrence of nonlinear distortion is avoided.

The transmission system according to the invention is characterized in that a level signal generator for producing a level signal characterizing the level of the signal to be transmitted is connected at the transmitter end to the analogue-to-digital converter, while the output of the analogue-to-digital converter and at the receiver end the input of the digital-to-analogue converter are each connected to a control circuit including a gate, normally closed, which is opened in the rhythm of the code groups at least during the pulse of maximum weight in the code groups, the output of the gate being connected to an integrating network for producing a control signal which is applied at the transmitter end through the control circuit for dynamic compression in reverse control to the dynamic control member connected to the analogue-to-digital converter and at the receiver end through the control circuit for dynamic expansion in forward control to the dynamic control member connected to the digital-to-analogue converter.

When using the steps according to the invention, the transmitted code groups contain two data; in particular, the code groups altogether characterize the variations in the analogue signals to be transmitted, while the number of pulses of maximum weight in the code groups occurring per unit time characterizes the compression used, so that the signal to be transmitted can be accurately recovered at the receiver end despite the use of a high degree of compression which is essential to an optimum reduction of the harmful effect of the quantization noise.

According to a further feature of the invention, the control circuits of the analogue-to-digital converter and of the digital-to-analogue converter at the transmitter end and at the receiver end, respectively, include the dynamic control members which control the coding unit and the decoding unit, respectively, of the analogue-to-digital converter and of the digital-to-analogue converter, respectively. Thus, the advantage is obtained that the two control systems at the receiver end and at the transmitter end can be constructed in the same manner.

The invention and its advantages will now be described more fully with reference to the FIGS.

Figure 8:
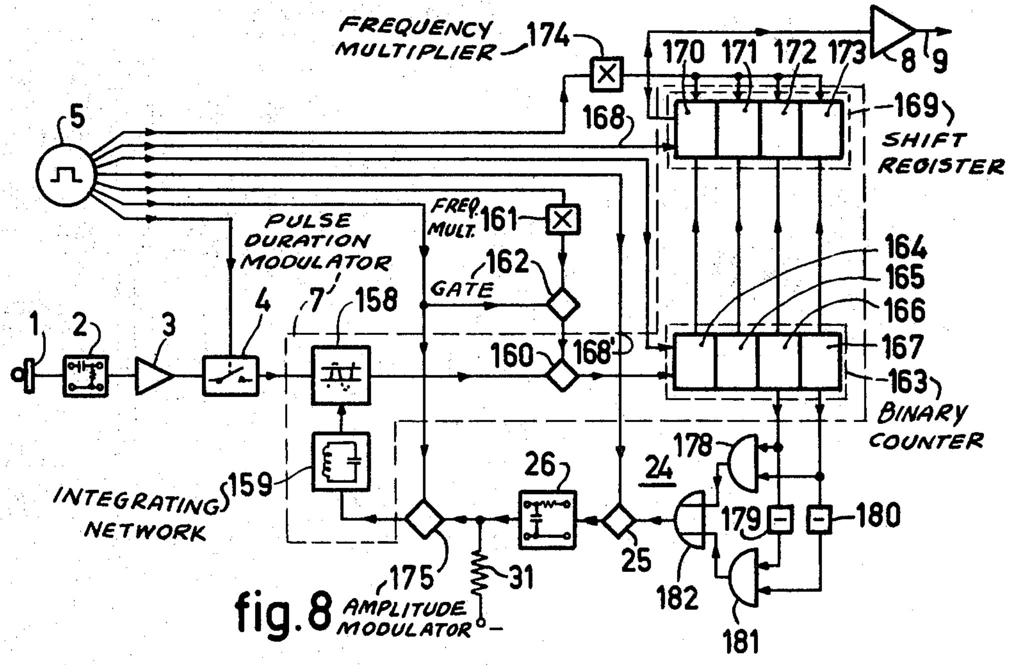
Figure 9:
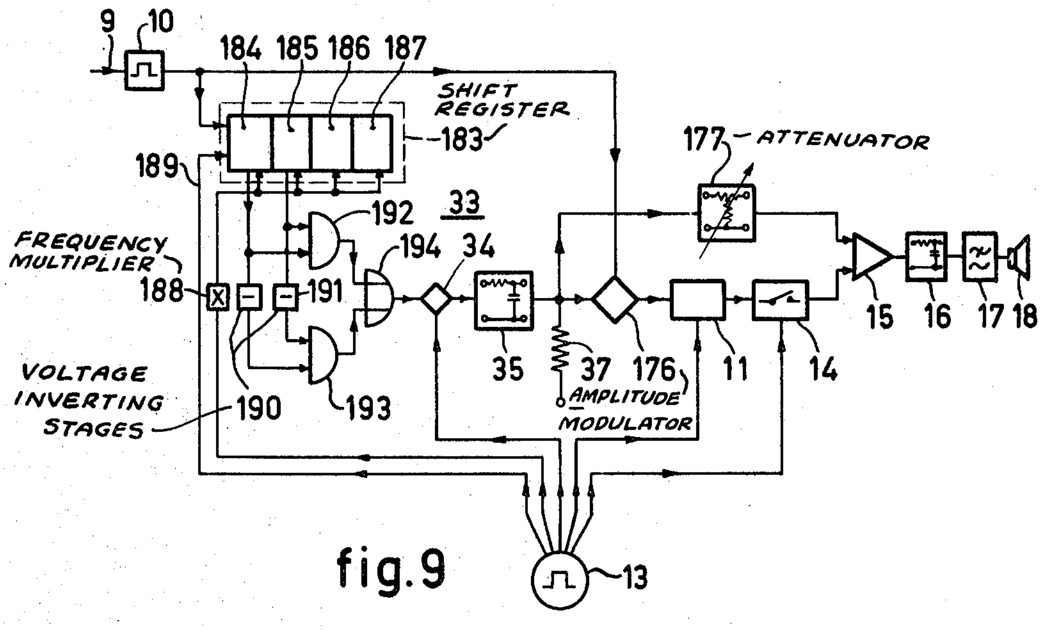
Figure 10:
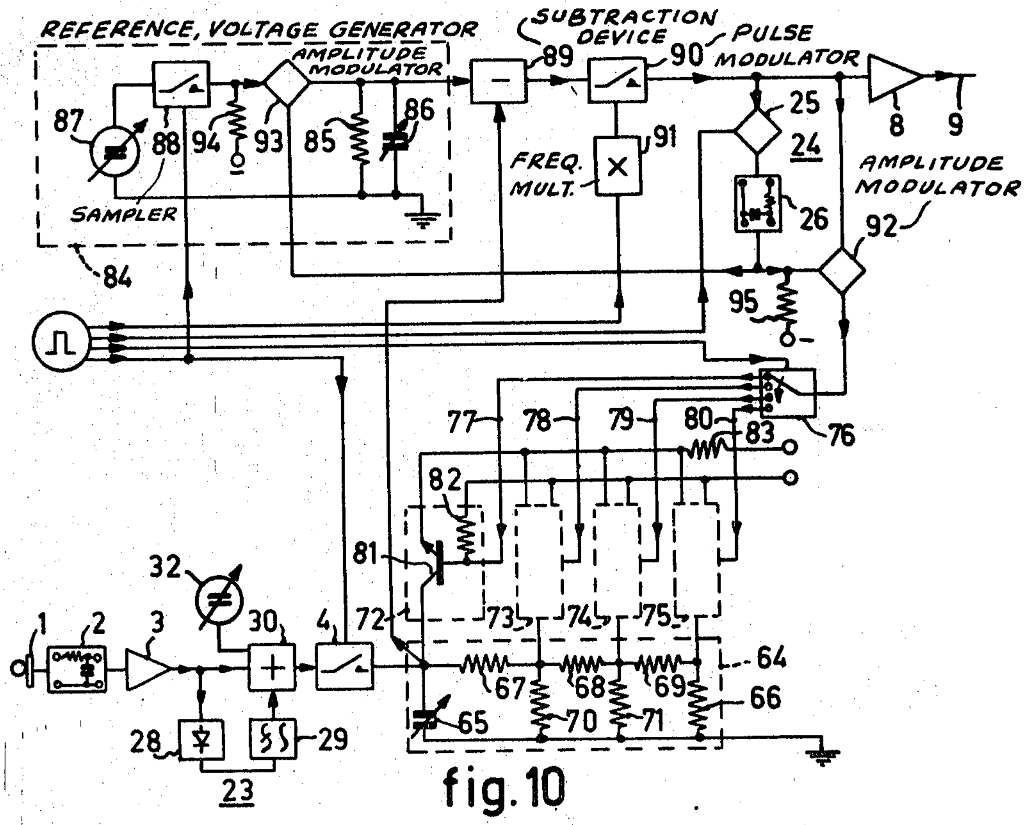
Figure 11:
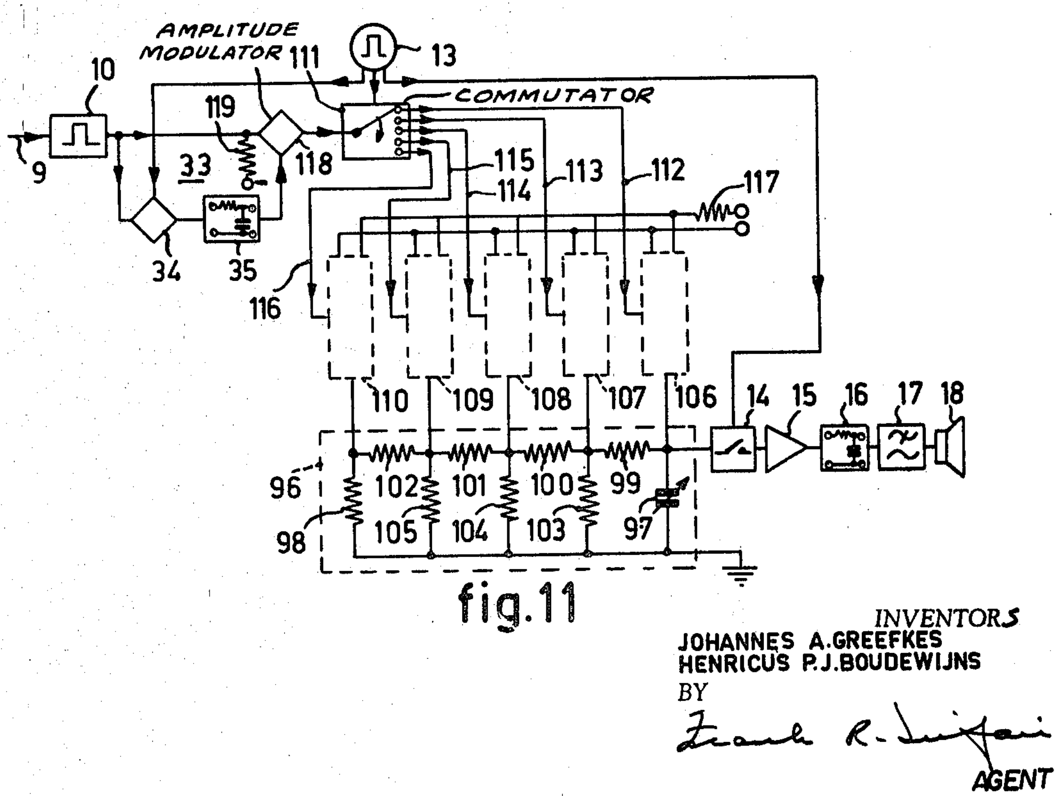
Figure 12:
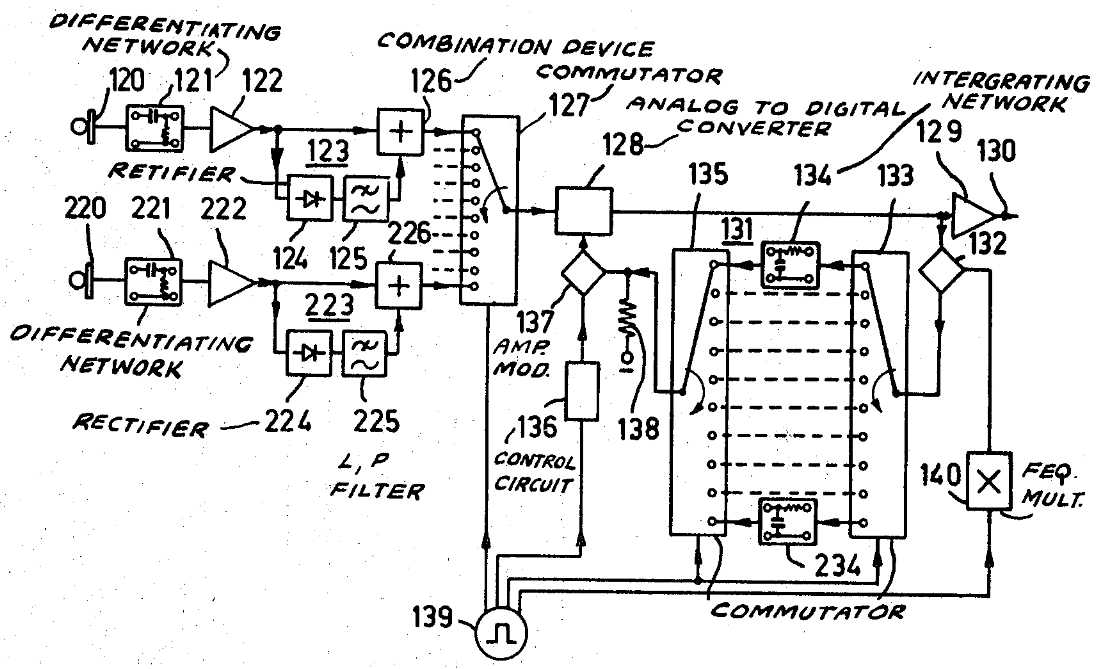
Figure 13:
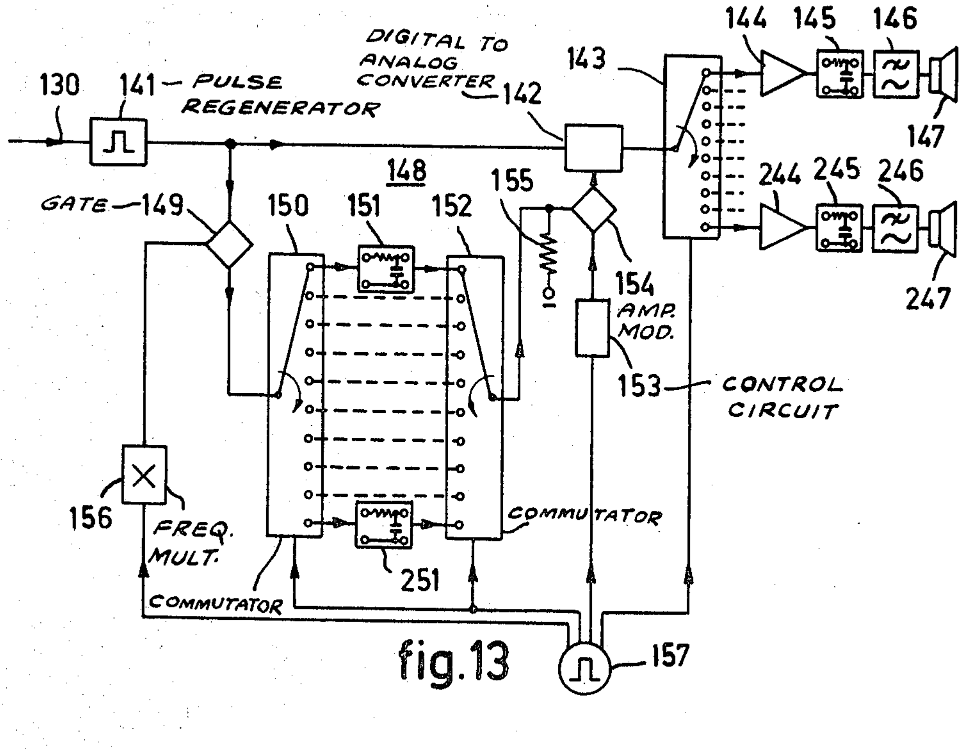

FIGS. 8 and 9, like FIGS. 10 and 11, show in greater detail a transmitter and a receiver, respectively, according to the invention; and FIGS. 12 and 13 show a transmitter and a receiver, respectively, for time-multiplex transmission according to the invention.

Figure 1:
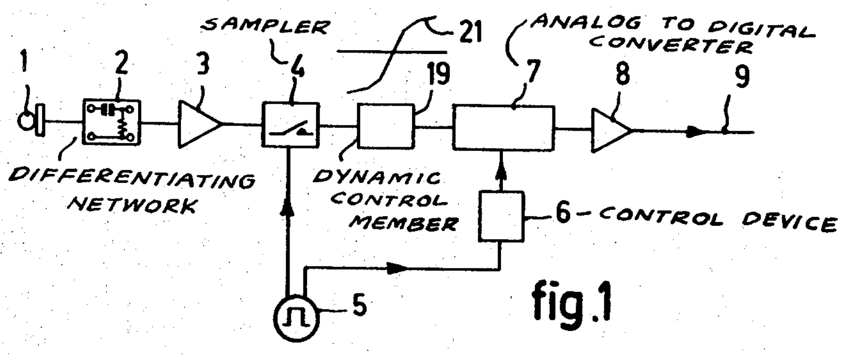
FIGS. 1 and 2 show block diagrammatically a known transmitter and a known receiver, respectively, for pulse code modulation.

In the known pulse-code modulation transmitter for the transmission of code groups comprising seven pulses shown block diagrammatically in FIG. 1, the speech signals in the band of from 300 to 3400 c/s derived from a microphone 1 are applied through a differentiating network 2 and a low-frequency amplifier 3 to a sampler 4 which is controlled in the rhythm of the code groups, for example, at a frequency of 8 kc/s, by sampling pulses from a control pulse generator 5.

The transmitter further includes an analogue-to-digital converter 7 controlled by a control device 6 which supplies control pulses for the analogue-to-digital converter 7 occurring in the rhythm of the pulses of a code group and characterizing by their amplitude the coding unit E of the analogue-to-digital converter. The control device 6 of the analogue-to-digital converter 7 is controlled by the pulses of 8 kc/s of the control pulse generator 5 which are shifted through a suitable interval relative to the sampling pulses.

Each time a sampling pulse from the control pulse generator occurs, the sampler 4 supplies a sampling of the speech signal to be transmitted, which sampling is converted in the analogue-to-digital converter 7 into a code group comprising seven pulses, in which the weights of the successive pulses decrease by a factor of 2 so that the successive pulses characterize in coding units signal values $2^6$ E, $2^5$ E, $2^4$ E...$2^0$ E. Particularly, the value of the sampling, measured in code units, at the instant of the first control pulse is compared in the analogue-to-digital converter 7 with the signal value $2^6$ E and in case the sampling exceeds the signal value $2^6$ E, a pulse is transmitted and the signal value $2^6$ E is subtracted from the sampling, while in case the sampling is smaller than the signal value $2^6$ E, no pulse is transmitted; at the subsequent control pulse, a similar comparison with the signal value $2^5$ E takes place, and so on, until after the seventh control pulse the complete code group has been built up.

After being amplified in an output amplifier 8, the code groups thus produced are transmitted through a transmission line 9.

Figures 2, 3, 4:
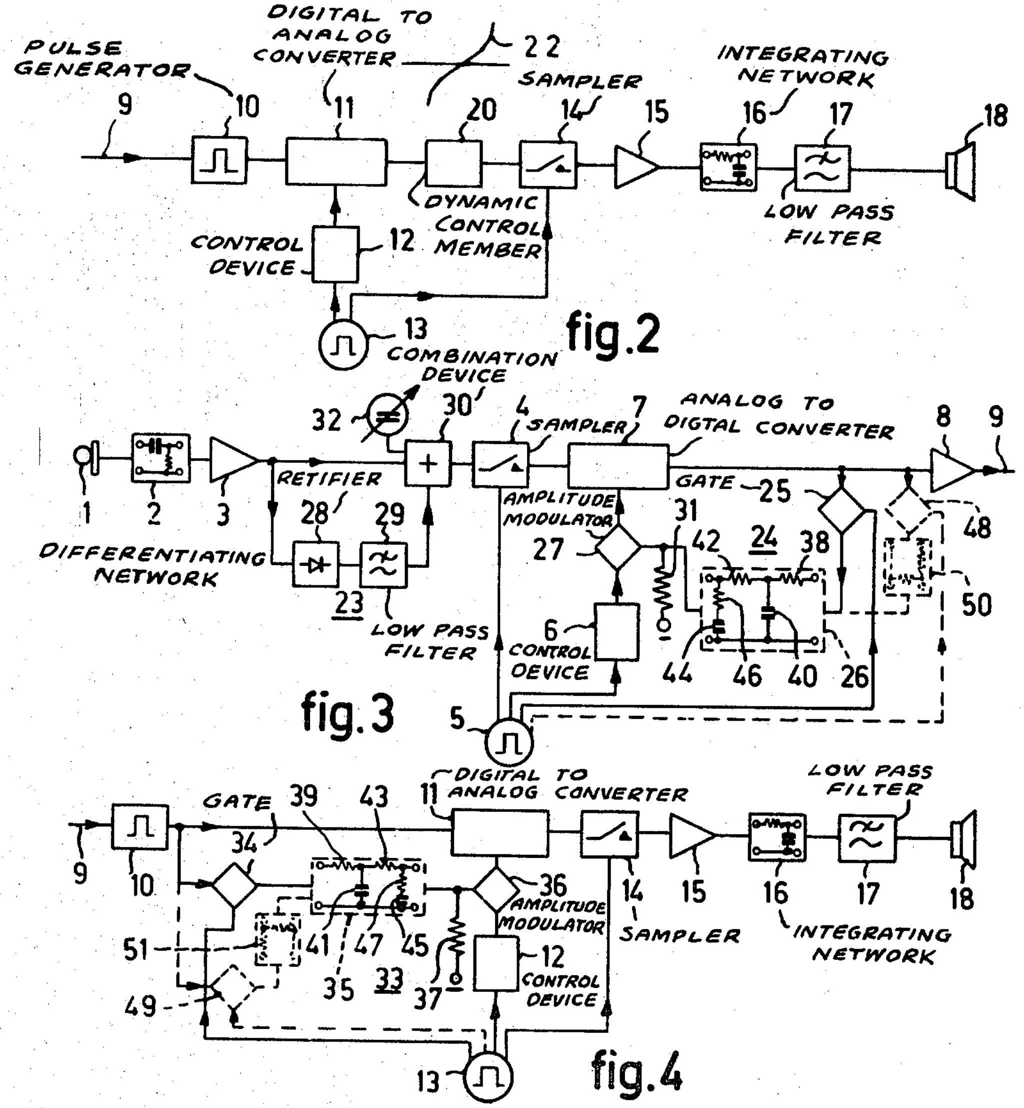
FIGS. 3 and 4 show block diagrammatically a transmitter and a receiver, respectively, for pulse code modulation according to the invention.

FIG. 2 shows a receiver cooperating with the transmitter of FIG. 1, in which, after pulse generation in accordance with their shape and the instant of their occurrence in a pulse generator 10, the pulses received through the line 9 are applied to a digital-to-analogue converter 11 to which are also applied pulses from a control device 12, which control pulses occur in the rhythm of the pulses of a code group and characterize by their amplitude the coding unit of the digital-to-analogue converter. The control device 12 of the digital-to-analogue converter 11 is controlled by the pulses from a control pulse generator 13 which is synchronized in the rhythm of the code groups at 8 kc/s, for example, by means of synchronizing pulse transmitted together with the code groups or by other known means; the synchronization of the control pulse generator 13 is not essential to the invention so that it will not be described further.

Upon the occurrence of each code group, the pulses of this code group are combined in accordance with their weights in the digital-to-analogue converter 11 so that an analogue signal characterized by this code group appears at the output of the digital-to-analogue converter 11, which signal is applied for further processing to a sampler 14 which is controlled by the pulses from the control pulse generator 13. Thus, after each code group, a sampling of the signal appearing at the output of the digital-to-analogue converter 11 is produced at the output of the sampler 14, which samplings, after being amplified in an amplifier 15, are applied through an integrating network 16 and a low-pass filter 17 to a reproduction device 18.

For the pulse-code modulation transmission system described above, the curve *a* of FIG. 5 indicates in dBs the ratio S/N between the signal and the quantization noise as a function of the decrease in the signal level. The quantization noise is independent of the signal level and its absolute value is substantially constant, that is to say that the ratio between the signal level and the quantization noise decreases substantially linearly from the maximum signal level to the minimum signal level. For pulse code modulation, with maximum signal level the sample formula $6n+2$ applies to the ratio between signal and quantization noise in dBs, where $n$ represents the number of pulses of a code group, so that for code groups comprising seven pulses this ratio is 44 dBs.

As appears from the relation between the signal-to-quantization noise ratio S/N and the signal level indicated by the curve *a*, with a low signal level the quantization noise becomes particularly disturbing and is no longer considered permissible in practice, for example, with a resultant signal-to-noise ratio of approximately 15 dBs.

In order to reduce the harmful effect of the quantization noise on the quality of the lower signal levels, dynamic control member 19 and 20 are connected in the transmitter of FIG. 1 to the input of the analogue-to-digital converter 7 and in the receiver of FIG. 2 to the output of the digital-to-analogue converter 11, respectively, which dynamic control members bring about an instantaneous compression and an instantaneous expansion, respectively, of the analogue signals applied to them. According to the modern techniques, the dynamic control members 19 and 20 are constituted by fixed networks having amplitude characteristics whose slopes vary discontinuously at given signal values, while moreover the requirement must be imposed that the amplitude characteristics of the two dynamic control members 19 and 20 extend accurately reciprocally in order to avoid the occurrence of nonlinear distortions. For illustration, FIG. 1 shows diagrammatically at 21 the amplitude characteristic of the dynamic control member 19, while FIG. 2 shows at 22 the amplitude characteristic of the dynamic control member 20.

Figure 5:
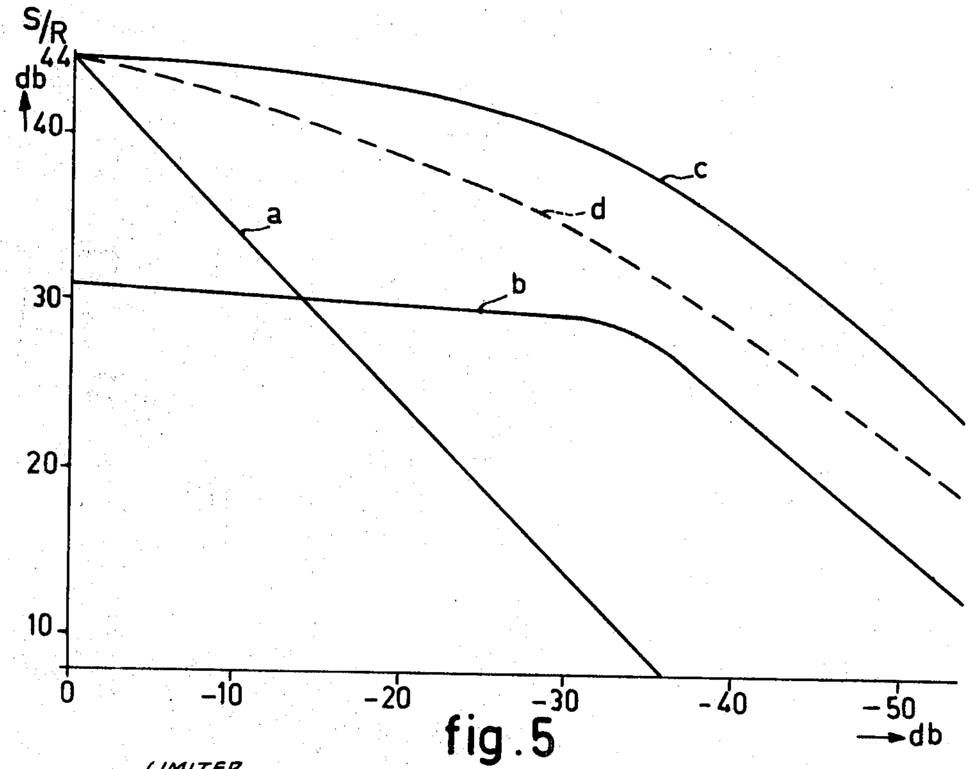
FIG. 5 shows a few signal-to-noise characteristics to explain the operation of the devices shown in the preceding FIGS.

In FIG. 5, the curve *b* indicates for this known system the ratio S/N between the signal and the quantization noise as a function of the signal level. By the use of the dynamic control members 19, 20, the harmful effect of the quantization noise on the lower signal levels is considerably reduced, but this reduction the harmful effect on the lower signal levels results in an increase of the quantization noise at the higher levels, more particularly at the maximum signal level, by approximately 13 dBs, and moreover this dynamic control is particularly susceptible to interferences in the transmission path.

According to the invention, these disadvantages of the known system, such as a harmful effect on the ratio between the signal and the quantization noise, the extremely critical adjustment of the amplitude characteristics of the two dynamic control members throughout the dynamic control range and the considerable susceptibility to interference are obviated in the transmission system according to the invention shown in FIGS. 3 and 4, FIG. 3 showing the transmitter and FIG. 4 the receiver. Elements corresponding to those of FIGS. 1 and 2 are designated by like reference numerals.

In the transmitter of FIG. 3, a level voltage generator 23 for producing a level signal characterizing the level of the speech signal to be transmitted is connected to the analogue-to-digital converter 7, while the output of the anglogue-to-digital converter 7 is connected to a control circuit 24 including a gate 25, normally closed, which is opened in the rhythm of the code groups during the pulse of maximum weight, the gate 25 being connected to an integrating network 26 having a cutoff frequency of the order of the low frequencies of the level signal, for example, 20 c/s, and producing a control voltage which is applied through the control circuit 24 for dynamic compression in reverse control to a dynamic control member 27 connected to the analogue-to-digital converter 7.

In the embodiment shown, the dynamic control member 27 is constituted by an amplitude modulator, which is included in the control circuit 6 of the analogue-to-digital converter 7 and which controls the amplitude of the control pulses and hence the coding unit of the analogue-to-digital converter 7, while the level voltage generator 23 is constituted by a rectifier 28 and a low-pass filter 29 the output voltage of which, after being combined with the speech signals to be transmitted in the band of from 300 to 3400 c/s in a combination device 30, is applied through the sampler 4 to the input of the analogue-to-digital converter 7. For example, the cutoff frequency of the low-pass filter is 100 c/s.

Each time a pulse of maximum weight occurs in the code groups, the gate 25 is opened by the pulses from the control pulse generator 5 which are applied as gate pulses to the gate 25 so that due to integration of the pulses derived from the gate 25 a control voltage is produced in the integrating network 26, which control voltage is applied as a modulation voltage to the amplitude modulator 27, as a result of which the control pulses from the analogue-to-digital converter 7 will vary with the control voltage produced. For an accurate control it is of advantage that the amplitude of the control pulses derived from the amplitude modulator 27 is substantially proportional to the control voltage produced in the integrating network 26, which is achieved in a simple manner by also applying to the amplitude modulator 27 through a resistor 31 a constant reference voltage as a modulation voltage, the value of which is adjusted so that in the absence of the control voltage of the integrating network 26 the amplitude of the control pulses is reduced considerably, for example, down to 1 percent to 2 percent.

If in the system described, instead of a speech signal, a direct voltage in the form of a constant level signal having an amplitude exceeding the amplitude characterized by the pulse of maximum weight in a code group is applied to the analogue-to-digital converter 7, the code groups will be built up by the subsequent amplitude comparisons in the analogue-to-digital converter 7 in the manner already described, while if a pulse of maximum weight occurs, this pulse is applied through the gate 25 to the integrating network 26. Each time when a pulse appears at the integrating network 26, the control voltage at the integrating network 26, and hence through the amplitude modulator 27 the coding unit substantially proportional to the control voltage of the integrating network 26, increases by a given value until with the increased coding unit the constant level signal is smaller than the signal value characterized by the pulse of maximum weight in a code group. The pulse of maximum weight in a code group is then no longer transmitted; the control voltage of the integrating network 26, and hence the coding unit, decreases until with this decreased coding unit the pulse of maximum weight in a code group characterizes a signal value which is smaller than the constant level signal, whereupon the pulse of maximum weight is again transmitted and the cycle described above is repeated.

With the transmission of a constant level voltage, the pulse of maximum weight in the successive code groups produced by the analogue-to-digital converter 7 is present or absent; if in the code groups produced the presence of a pulse is denoted by "1" and the absence of this pulse by "0", in the embodiment shown, in which code groups comprising seven pulses are transmitted and the first pulse of the code group has the maximum weight, the code groups (1000000) and (0111111) will be produced, which characterize in coding units signal values of 64 and 63, respectively. In actual fact, by the use of the steps according to the invention, it is achieved that for the pulse of maximum weight in the code groups the analogue-to-digital converter 7 also forms part of a loop of the pulse delta-modulation type which further comprises the gate 25, the integrating network 26 and the amplitude modulator 27. In the embodiment shown, upon the occurrence of each pulse of maximum weight in a code group, the amplitude of the level signal of the level signal generator 23 is compared in the analogue-to-digital converter with the coding unit derived from the amplitude modulator 27 multiplied by a constant factor, while depending upon the polarity of the voltage difference in this amplitude comparison a pulse is transmitted or suppressed, which pulses are also applied through the gate 25 to the integrating network 26.

The loop described tends to reduce the said voltage difference in the amplitude comparison to zero, as a result of which the control signal derived from the integrating network 26, and hence also the coding unit derived from the amplitude modulator 27, apart from a constant multiplication factor, forms a quantitative approximation of the level voltage. In other words and as illustrated in a time diagram, the control voltage of the integrating network multiplied by a constant factor fluctuates about the constant level voltage.

If the level voltage is increased, the control voltage of the integrating network 26 and hence also the coding unit will vary substantially in direct proportion to this increase in level voltage, while in order to produce this increased level voltage the number of pulses applied to the integrating network 26 per unit time will also increase. Conversely, if the level voltage is decreased, the coding unit and hence the number of pulses applied per unit time through the gate 25 to the integrating network will decrease substantially in direct proportion to this decrease in level voltage. In recapitulation, it can be stated that the coding unit varies substantially in direct proportion to the level voltage, while the value of the level voltage is characterized by the number of pulses transmitted by the gate 25 per unit time, which pulses represent in the code groups the pulses of maximum weight.

If the direct voltage constituted by the level signal in the frequency band of from 0 to 100 c/s is combined in the combination device with an alternating voltage in the form of a speech signal in the frequency band of from 300 to 3400 c/s, this alternating voltage substantially does not influence the value of the control voltage of the integrating network 26 and the coding unit, while as before the value of the coding unit is characterized by the number of pulses transmitted by the gate 25 per unit time. The fact that the coding unit employed is substantially directly proportional to the level associated with the speech signal, or in other words, that the compression in the dynamic control range is very high, results in a very accurate coding throughout the dynamic control range of, for example, 40 dBs.

When using the steps according to the invention, the code groups produced by the analogue-to-digital converter 7 contain two data of the speech signal to be transmitted; the code groups characterize the variation of the speech signal and the number of pulses of maximum weight of the code groups occurring per unit time characterizes the level of the speech signals, as a result of which the signals to be transmitted can be reproduced at the receiver and with great accuracy. For the adjustment of the analogue-to-digital converter 7 an adjustable direct voltage source 32 is connected to the combination device 30.

In the cooperating receiver shown in FIG. 4, the two data of the code groups are used to recover the speech signals to be transmitted. On the one hand, the code groups derived from the pulse regenerator 10 are applied to the digital-to-analogue converter 11 and on the other hand to a control circuit 33 which for dynamic expansion controls the coding unit of the digital-to-analogue converter 11 in forward control. The construction of the control circuit 33 is similar to that of the control circuit 24 at the transmitter end; more particularly, the control circuit 33 includes a gate 34, normally closed, which upon the occurrence of each pulse of maximum weight in a code group is opened by a gate pulse of the control pulse generator 13, an integrating network 35 having the same cutoff frequency as the integrating network 26 at the transmitter end and an amplitude modulator 36 which is included in the control circuit 12 of the digital-to-analogue converter 11 and to which also a constant reference voltage is applied as a modulation voltage through a resistor 37.

In the embodiment shown, the pulses of maximum weight of the code groups transmitted by the gate 34 the number of which per unit time is accurately equal to the number of pulses transmitted by the gate 25 at the transmitter end, ensure after integration in the integrating network 35 through the amplitude modulator 36 an accurate proportionality between the value of the decoding unit at the receiver end and the value of the coding unit at the transmitter end, which coding unit, as set out hereinbefore, is substantially proportional to the level of the speech signals to be transmitted. Not only is the accuracy of reproduction considerably improved, but also the disturbing quantization noise at the lower signal amplitudes is materially reduced; when the speech level is reduced by a given factor, the amplitude of the decoding unit will be reduced accordingly, which means that the amplitude of the quantization noise has also decreased by the same factor.

In FIG. 5, the ratio S/N between signal and quantization noise as a function of the signal level is indicated for the system according to the invention by the curve *c* which clearly illustrates the considerable improvement in the ratio between signal and quantization noise when compared with that of the known transmission system shown in FIGS. 1 and 2. For example, when compared with the transmission system of FIGS. 1 and 2 not using dynamic control members 19, 20 (curve *a* ), a decrease of the ratio between signal and quantization noise at the lower signal amplitudes does not occur, and when compared with the transmission system using amplitude control members 19, 20 (curve *b*), an improvement of 13 dBs is obtained throughout the dynamic control range. It has been found that moreover nonlinear distortion in the transmission system according to the invention is avoided, while the susceptibility to interference is considerably reduced; more particularly, an interference probability of $10^{-2}$ or $10^{-3}$ in the transmission path does not influence the dynamic control described.

While retaining all the advantages for pulse code modulation transmission, its disadvantages are reduced to a large extent, which results in a considerably enlargement of the field of uses of pulse code modulation transmission. For example, the improvement by 13 dBs in the ratio between the signal and quantization noise when compared with the commonly used transmission system of FIGS. 1 and 2 means that the number of pulses in the code groups can be reduced by two for attaining the same ratio between signal and quantization noise as in the known system, so that on the one hand the analogue-to-digital converters and the digital-to-analogue converters are considerably simplified, which ultimately results in a simplification of the apparatus, while on the other hand in time-multiplex transmission, the reduction in the number of pulses of the code groups by 2 results in the number of time-multiplex channels and hence the transmission capacity being raised by 30 percent to 40 percent.

It has been found that a speech transmission of excellent intelligibility can be obtained even with code groups comprising three pulses; the ratio S/N between signal and quantization noise according to the aforementioned formula is $6n+2$, in this case 20 dBs, which value remains substantially constant throughout the dynamic control range. The construction of this materially improved system is surprisingly simple.

In the pulse code modulation transmission system shown, the integrating network 26 at the transmitter end and the integrating network 35 at the receiver end may each consist of one section comprising a resistor 38 and a capacitor 40 and a resistor 39 and a capacitor 41, respectively, the cutoff frequency of which is preferably of the order of the low frequencies of the level signal, for example, 20 c/s. Investigations have shown that it is of advantage for an accurate dynamic control when the integrating networks 38, 40 and 39, 41, respectively, are each connected in cascade arrangement with a second section, the cutoff frequency of which is higher than that of the first section but is at the most equal to the low signal frequencies, for example, 150 c/s; this second section preferably comprises a series resistor 42 and 43, respectively, and a parallel impedance comprising the series-combination of a capacitor 44 and 45, respectively, and a coupling resistor 46 and 47, respectively. The coupling resistors 46 and 47, respectively, ensure that part of the output voltage of the first section 38, 40 and 39, 41, respectively, is produced between the output terminals together with the integration voltage at the capacitors 44 and 45, respectively.

A favourable proportioning of the elements of the double integrating network shown is:

Resistors 38,39: 800 $k\Omega$ *capacitors 40,41:* 0.01 $\mu$F
resistors 42,43: 100 $k\Omega$ *capacitors 44,45:* 0.01 $\mu$F resistors 46,47: 8 $k\Omega$ In further investigations of the pulse code modulation transmission system according to the invention, it was ascertained what influence would be involved in applying in addition to the pulse of maximum weight further pulses of the code groups for the dynamic control, especially the pulse of maximum weight but one. This may be achieved, for example, in the manner indicated by dotted lines in FIGS. 3 and 4 by selecting these pulses, whose weight is a factor of 2 smaller than that of the pulses of maximum weight, by means of a gate 48 and 49, respectively, controlled by the control pulse generator 5 and 13, respectively, and by applying them through a damping network 50 and 51, respectively, having a damping factor 2 to the integrating network 26 and 35, respectively. The variation of the dynamic control thus becomes considerably less steep, which in the signal-to-noise characteristics of FIG. 5 results in the variation of the ratio between signal and quantization noise indicated by the dotted curve *d* which descends to the lower signal levels. Although an improvement is obtained when compared with the curves *a* and *b* of the known systems, this improvement is smaller than that of the transmission system according to the invention described hereinbefore (curve *c*) in which solely the pulse of maximum weight is applied. When further pulses of the code groups are used for the dynamic control, the decrease in the ratio between signal and quantization noise towards the lower signal levels is enlarged.

It is remarkable that not only an optimum effect, but also a very simple construction of the apparatus is obtained in this system.

For the sake of completeness, it should be noted that the two pulses of maximum weight applied for the control may alternatively be selected in the gate 25 and 34, respectively, and by applying them through a digital-to-analogue converter for code groups comprising two pulses to the integrating network 26 and 35, respectively.

Figure 6:
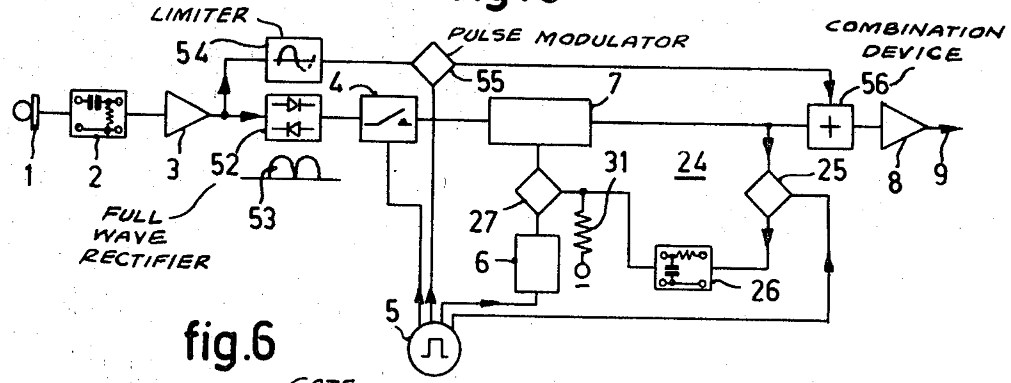
FIGS. 6 and 7 show alternative embodiments of the transmitter and receiver according to the invention shown in FIG. 3 and in FIG. 4, respectively.
Figure 7:
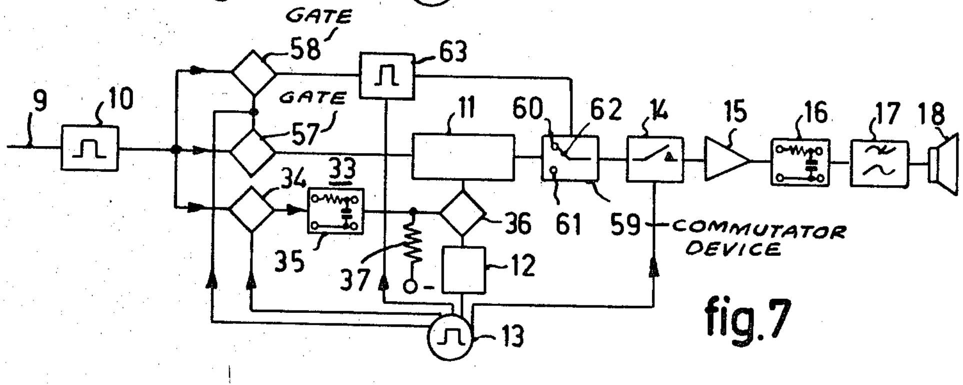

FIGS. 6 and 7 show alternative embodiments of the transmitter and receiver shown in FIGS. 3 and 4, respectively, according to the invention. Corresponding elements are designated by like reference numerals.

The pulse-code modulation transmitter shown in FIG. 6 differs from that of FIG. 3 in the construction of the level generator. In particular, the speech signals derived from the low-frequency amplifier 3 are applied to a full-wave rectifier 52 in order to produce a full-wave rectified speech signal which is applied without smoothing through the sampler 4 to the analogue-to-digital converter 7. For the sake of clarity, reference numeral 53 of the FIG. denotes the output signal of the full-wave rectifier 52.

In order to transmit the polarity of the speech signal to the receiver, the speech signal derived from the low-frequency amplifier 3 is applied, after being limited in a limiter 54, to a pulse modulator 55 which is controlled by the control pulse generator 5 and which supplies a pulse, for example, only with a positive polarity of the speech signal, which pulse is combined with the code groups produced by the analogue-to-digital converter 7 in a combination device 56. These pulses characterizing the polarity of the signals to be transmitted, briefly termed the polarity pulses, are each time transmitted before the code groups produced by the analogue-to-digital converter 7.

In the arrangement shown, the full-wave rectification in the full-wave rectifier 52 results in a level signal which characterizes the speech signals to be transmitted and which is applied through the sampler 4 to the analogue-to-digital converter 7, which, like in the embodiment of FIG. 3, includes a control circuit 24 comprising a gate 25, an integrating network 26 and an amplitude modulator 27 connected in the control device 6 of the analogue-to-digital converter 7. Like in the embodiment of FIG. 3, the analogue-to-digital conversion is effected in the analogue-to-digital converter 7 of this arrangement with the aid of a coding unit which is directly proportional to the level signal, while the number of pulses of maximum weight of the code groups occurring per unit time characterizes the level signal.

FIG. 7 shows the receiver cooperating with the transmitter of FIG. 6. In this arrangement, the pulses regenerated in the pulse regenerator 10 are applied in parallel arrangement to three gates 34, 57, 58 controlled by the control pulse generator 13, the gate 34 being normally closed and being opened only when a pulse of maximum weight of the code groups occurs; the gate 57 is normally opened and is closed only upon the occurrence of the polarity pulses, while the gate 58 is normally closed and is opened only upon the occurrence of the polarity pulses.

The incoming code groups are applied through the gate 57 with suppression of the polarity pulses to the digital-to-analogue converter 11, the decoding unit of which is controlled like in FIG. 4 in forward control by the control circuit 33 comprising the gate 34, the integrating network 35 and the amplitude modulator 36. The rectified signals 53 applied to the input of the analogue-to-digital converter 7 at the transmitter end then appear at the output of the digital-to-analogue converter 11, which signals are applied for recovering the original speech signals to a commutator device 59 comprising two contacts 60 and 61 at which the output signal from the digital-to-analogue converter 11 appears with opposite polarities, and a switch 62 which in accordance with a switching signal obtained from the polarity pulses connects either the contact 60 or the contact 61 to the sampler 14. In particular, the switching signal is produced by means of a bistable pulse generator 63 which in the presence of a polarity pulse at the gate 58 occupies one state of equilibrium and in the absence of a polarity pulse in a code group is set to the other state of equilibrium by a pulse from the control pulse generator 13.

Thus, in the embodiment of the transmission system according to the invention shows in FIGS. 6 and 7, the original speech signals were recovered by means of a level signal generator including a full-wave rectifier 52 without the use of a smoothing filter. It is essential to the transmission system in accordance with the invention to use a level generator which is connected to the analogue-to-digital converter and which, as already illustrated in FIGS. 3 and 6, may be of different types; however, modifications are possible without leaving the scope of the invention, For example, the level signal generator may be connected in or after the analogue-to-digital converter for digitally producing the level signal.

Moreover, without leaving the scope of the invention, the amplitude modulators 27 and 36, respectively, included in the control circuits 6 and 12, respectively, in FIGS. 3, 6 and 4, 7, respectively, may be replaced by differently constructed dynamic control members. For example, at the transmitter end the input of the analogue-to-digital converter 7 and at the receiver end the output of the digital-to-analogue converter 11 may include a variable damping network, a variable $m\mu$-tube or a transistor controlled by the control circuits 24 and 33, respectively. If required, for this purpose, in the design of the analogue-to-digital converter in the form of a pulse duration modulator and a subsequent digital counter of the kind described, for example, in Holzler and Holzwarth "Theorie und Technik der Pulsmodulation", 1957, pages 452 —455 the duration of the pulses produced in the pulse duration modulator may be varied in accordance with the control signal of the control circuit.

FIGS. 8 and 9 show in greater detail a transmitter and a receiver, respectively, according to the invention with the use of such an analogue-to-digital converter with a pulse duration modulator and a level signal generator designed in digital techniques.

In the transmitter device of FIG. 8 the analogue-to-digital converter includes a pulse duration modulator 158 in the form of a bilateral limiter to which, due to integration of pulses from the control pulse generator 5 in an integrating network 159, a sawtooth voltage is applied, together with samplings of the speech signal to be transmitted. Dependent on the polarity and magnitude of such samplings, the pulse duration modulator 158 provides pulses of varying duration serving as gate pulses for a normally closed gate 160 which is also fed with pulses obtained by frequency multiplication of the pulses from control pulse generator 5 in a frequency multiplier stage 161. For example, in case of positive polarity and maximum amplitude of the speech signals, the output pulse from the pulse duration modulator 158 will have a maximum duration and 15 pulses from the frequency multiplier 161 will be passed by the gate 160, whereas in case of negative polarity and maximum amplitude of the speech signals the duration of the output pulses will be minimum and no pulses from the frequency multiplier 161 will be transmitted by the gate 160. For the practical embodiment it is advantageous to apply the pulses from frequency multiplier 161 to the gate 160 through a gate 162, which is open only during the maximum duration of the pulses derive from the pulse duration modulator.

To produce the specified code groups, the output pulses from gate 160 are applied to a binary counter 163 with 4 counting elements 164 to 167, which thus can count up to $2^4$ the position of said counting elements being registered while using a reading pulse from lead 168 in a shift register 169 having 4 shift register elements 170 to 173, the content of which is passed on by means of shift pulses obtained by frequency multiplication of the pulses from control pulse generator 5 in a frequency multiplier 174. After registration of the position of counter 163 in the shift 169, the counter 163 is restored to its initial position by a resetting pulse from lead 168.

As may be seen from the Table below, the desired code groups are transmitted by the transfer of the position of counter 163 via the shift register 169. The values of the signal X to be transmitted in code units are listed in the first column of the Table, the number of pulses N at the output of the gate 160 in the second column, the position Y of the counting elements in the sequence 164, 165, 166, 167 in the third column, a "0" indicating the rest position and "1" the working position of a counting element, while the final column will be explained hereinafter.

| X | N | Y | Z |
|---|---|---|---|
| +7.5 | 15 | 1111 | 1 |
| +6.5 | 14 | 0111 | 1 |
| +5.5 | 13 | 1011 | 1 |
| +4.5 | 12 | 0011 | 1 |
| +3.5 | 11 | 1101 | 0 |
| +2.5 | 10 | 0101 | 0 |
| +1.5 | 9 | 1001 | 0 |
| +0.5 | 8 | 0001 | 0 |
| −0.5 | 7 | 1110 | 0 |
| −1.5 | 6 | 0110 | 0 |
| −2.5 | 5 | 1010 | 0 |
| −3.5 | 4 | 0010 | 0 |
| −4.5 | 3 | 1100 | 1 |
| −5.5 | 2 | 0100 | 1 |
| −6.5 | 1 | 1000 | 1 |
| −7.5 | 0 | 0000 | 1 |

This Table permits of reading directly, at a given signal value X, the number of output pulses N from the gate 160 and the position Y of the counting elements 164 to 167. For example, if the signal value lies + 3.5 and + 4.5 coding elements E, the number of output pulses N is 11 and the position Y of the counting elements 614 to 167 of the binary counter 163 is in this sequence 1101, which position Y of the counter characterizes the number of emitted pulses N in a binary numerical system, since the position 1101 represents a numerical value $1 \times 2^0 + 1 \times 2^1 + 0 \times 2^2 + 1 \times 2^3 = 11$. Thus the counting elements 164, 165, 166, 167 of the binary counter 163 characterize in this sequence the pulses of increasing weights in the emitted code groups, the position of the final counting element 167 of counter 163 representing the polarity of the signal to be transmitted, namely as can be seen from the Table, the counting element assumes the positions 1 and 0 at a positive and negative value, respectively, of the signal X.

Dependent on the shift direction of the shift register 169, the positions of the counting elements 164 to 167 may be emitted in this sequence or in the reverse sequence, i.e. in this transmitter device there is complete freedom to emit code groups where the weight of the successive pulses in a code group increases or decreases. Since the digital-to-analogue converter 11 at the receiver end becomes very simple for code groups having successive pulses of increasing weight, the embodiment described utilizes this mode of transmission.

For level control, the amplitude of the pulses from control pulse generator 5 applied to the integrating network 159 is controlled in an amplitude modulator 175 by the output voltage of the integrating network 26. Thus the sawtooth voltage derived from the integrating network 159 will also vary with the control voltage for dynamic compression and hence also the duration of the output pulse from the pulse duration modulator 158, which means a dynamic compression of the speech signals to be transmitted.

In the transmitter described, in which a polarity pulse characterizing the speech signal is transmitted with the code groups, a very simple digital level voltage generator is obtained by connecting to the analogue-to-digital converter 7 in the control circuit 24 a selecting gate in the form of an AND-gate 178, to which the polarity pulse and the pulse of the maximum weight in the code groups, which pulses coincide in time, are applied. More particularly the inputs of the AND-gate 178 are connected to the counting elements 166, 167 of the binary counter 163, which counting elements after each termination of the binary counting of the pulses from gate 160 characterizes by their positions the polarity of the speech signal to be transmitted and its largest amplitude respectively. In practice it appears to be advantageous to connect a second selecting gate in the form of an AND-gate 181 to the counting element of the binary counter 166, 167 via voltage inverting stages 179, 180 in order to produce inverted voltages, the output of AND-gate 181 and the output of AND-gate 178 being connected via a combination device in the form of an OR-gate 182 to the gate 25 to produce the control voltage serving for dynamic compression by integration in the integrating network 26.

The two AND-gates 178, 181 provide a pulse signal characterizing the level of the speech signal to be transmitted, as will now be explained more fully with reference to the Table given hereinbefore. When viewing the final two numericals in the binary number Y, which characterize respectively the polarity of the speech signal to be transmitted and its maximum amplitude, the two numericals are formed to be characterized by "1" and "0" respectively for a high positive amplitude value and a high negative amplitude value of the signal be transmitted, so that a high signal level occurs if the two numericals are equal and a low signal level occurs if they are different.

The above-mentioned effect is utilized in the device described, in order to produce the level control signal by digital means. In fact, if both numericals are given by a "1" the AND-gate 178 supplies via the OR-gate 182 a pulsatory voltage of positive polarity to gate 25, whereas if both numericals are given by an "0" the AND-gate 181 provides via the OR-gate 182 a pulsatory voltage of positive polarity. In the Table Z represents the output voltage of the OR-gate 182, which output voltage, as can be seen from the Table, is characterized by "1" and "0" at a high signal level and a low signal level respectively.

As has been described hereinbefore, a level signal is then built digitally and in combination with the gate 25 controlled by the control pulse generator, pulses are obtained which contain a control voltage for dynamic compression by integration in the integrating network 26, thus obtaining a very effective dynamic compression.

In its practical form the device described may be simplified still further and more particularly the separate voltage inverting stages 179, 180 can be economized, since directly inverted voltages may be derived from the outputs of the counting elements 166, 167 of the binary counter 163 which, as is usually the case, are formed by bistable triggers, while also the gate 25 can be economized by including its function in the AND-gates 178, 181, which is achieved by providing each of them with a third input to which the pulses from control pulse generator 5 are applied. The device described can be built up to a great extent in digital techniques; for example in addition to the digitalled level signal generator, the integrating network 26 can be realized according to digital techniques.

With simplicity of structure and far-going build-up in digital techniques, thus permitting considerable integration in the solid state, tests have revealed that an improvement in the ratio between signal and quantization noise towards the lower signal amplitudes is even obtained.

FIG. 9 shows a receiver cooperating with the transmitter of FIG. 8, the pulses incoming through lead 9 being applied, after regeneration in the pulse regenerator, to a digital-to-analogue converter 11 of the Shannon type, which, as is well-known, is formed substantially by an integrating network having a time constant such that is output voltage between two succeeding pulses of a code group has decreased by 5 percent.

When using a digital-to-analogue converter of the Shannon type the dynamic control is very simple and more particularly it is formed by an amplitude modulator 176 for the output pulses from the pulse regenerator 10 which is fed by way of modulation with the output voltage from the integrating network 35 and also with the constant reference voltage via the resistor 37.

In this case the amplitude of the output pulses from amplitude modulator 176 varies and hence also the output voltage from the digital-to-analogue converter 11 of the Shannon type, since this, as previously mentioned, is formed by a suitable proportioned integrating network. In this way the desired dynamic expansion is realized.

In this digital-to-analogue converter 11, in addition to the speech signal, the control voltage occurs which is often not disturbing since the highest frequencies of the control voltage lie below the lowest speech frequencies. However, under certain conditions, it may be advantageous to suppress said control voltage and this may be achieved in a simple manner by using the modulating voltage of modulator 176 as a compensation voltage, for example, by applying the modulating voltage to amplifier 15 through a suitably formed attenuator 177.

In the receiver of FIG. 9 the dynamic control is effected in a similar manner to that in the transmitter. More particularly in the receiver, in order to produce the control voltage for dynamic expansion, the incoming regenerated code groups are applied to a shift register 183 having four shift register elements 184, 185, 186, 187 the content of which is passed on, synchronously with the content of the shift register 169 at the transmitter end, with the aid of pulses from a frequency multiplier fed by pulses from the control pulse generator 13. In each case before the occurrence of the next code group, the shift register 183 is set back to its initial position by means of reset pulses from the control pulse generator 13, which are applied through lead 189 to the shift register 183.

In the manner as has been described already for the transmitter end, the pulses of the code groups characterizing the polarity of the signal to be transmitted and its maximum signal value are applied directly, and via voltage inverting stages 190, 191, to selecting gates in the form of AND-gates 192, 193 which are connected through an OR-gate 194 to the gate 34 controlled by control pulse generator 13.

The number of pulses passed per unit time by the gate 34 is exactly the same as that passed by the gate 25 at the transmitter end, so that by integration in the integrating network 35 the control voltage is obtained across amplitude modulator 176 for the expansion control is exactly the same as for the compression control, resulting in accurate synchronism between these controls. The receiver described is of a very simple design and, like at the transmitter end, may be built up to a great extent in digital techniques.

In their design, the two AND-gates 178, 181, the two inverting stages 179, 180 and the OR-gate at the transmitter end, together with the corresponding arrangement 190, 191, 192, 193, 194 at the receiver end may be formed by a modulo-2 combination device, as may directly appear from the Table hereinbefore. If the last two numericals of the counter position Y are the same, for example, "1" or "0", the modulo-2 combination device provides a "1" pulse, whereas if these numericals differ from each other the modulo-2 combination device provides a "0" pulse. Similarly as the output voltage of the OR-gate 182 at the transmitter end or the output voltage of the OR-gate 194 at the receiver end, the modulo-2 combination device thus produces an output voltage as indicated by Z in the Table.

FIGS. 10 and 11 show in detail a transmitter and a receiver, respectively, of the kind shown block diagrammatically in FIGS. 3 and 4 according to the invention, which are designed for pulse-code modulation transmission with code groups comprising five pulses, the weights of the successive pulses of a code group decreasing by a factor of 2. The transmitter and the receiver include an analogue-to-digital converter and a digital-to-analogue converter, respectively, which have been described in copending U.S. Pat. application S.N. 757,018.

Elements corresponding to those of FIGS. 3 and 4 are designated in FIGS. 10 and 11 by like reference numerals.

Like in FIG. 3, in the transmitter of FIG. 10 the signals derived from the combination device 30 consisting of the speech signal originating from the microphone 1 and of the level signal originating from the level signal generator 23 comprising rectifier 28 and low-pass filter 29 are applied for further processing in the analogue-to-digital converter to the sampler 4. As has been set out in copending U.S. Pat. application S.N. analogue-to-digital 757,018 the analogue-to-digital converter has a network 64 comprising a capacitor 65 and a laddered network connected to the capacitor 65 and comprising a terminal resistor 66 and three sections comprising series resistors 67, 68, 69 and parallel resistors 70, 71, the attenuation factors of the subsequent sections of the laddered network to the capacitor 65 being rendered equal to $\alpha$, which is achieved in a simple manner by rendering the series resistors 67, 68, 69 and also the parallel resistors 70, 71 equal to each other.

To the ends of the sections of the laddered network are connected four parallel branches 72, 73, 74, 75 which each include a normally closed current source which is opened by pulses originating from a commutator 76 controlled by the control pulse generator 5 through output conductors 77, 78, 79, 80, as a result of which the charge of the capacitor 65 is reduced by a given amount. As has been illustrated in detail for the parallel branch 72, the normally closed current source in each of the parallel branches 72, 73, 74, 75 comprises a transistor 81, while through a resistor 82 a reverse voltage is applied to the base of each transistor 81 and each base is connected to one of the output conductors 77, 78, 79, 80 of the commutator 76, the collectors of the transistors 81 being connected to the network 64 and the transistors 81 having a common emitter resistor 83.

Furthermore, the analogue-to-digital converter includes a reference voltage generator 84 comprising a capacitor 86 shunted by a resistor 85 and connected to a constant voltage source 87 through a sampler 88 controlled by the control pulse generator 5. In a subtraction device 89, the voltage at the capacitor 65, which is connected through the sampler 4 to the combination device 30, is compared with the reference voltage of the reference voltage generator 84 and the difference voltage thus produced is applied to a pulse modulator 90 to which are also applied locally produced pulses occurring in the rhythm of the pulses in the code groups. These locally produced pulses are derived from a frequency multiplier 91 connected to the control pulse generator 5.

In the arrangement shown, the samplers 4,88 are opened simultaneously by pulses from the control pulse generator 5, the voltage at the capacitor 65 of the laddered network being compared with the reference voltage of the reference voltage generator 84. According as the value of the voltage at the capacitor 65 is larger or smaller than that of the reference voltage and as the difference voltage has a positive or a negative polarity, the pulse modulator 90 is rendered conducting or nonconducting so that the local pulse of the frequency multiplier 91 applied thereto is passed on or suppressed. On the one hand, the output pulses from the pulse modulator 90 are applied for further transmission through the line 9 to an output amplifier 8 and on the other hand to the commutator 76 which, when such a pulse occurs, applies it through one of the conductors 77, 78, 79, 80 to one of the parallel branches 72, 73, 74, 75 in order to render the transistor 81 included in this branch, conducting as a result of which the charge of the capacitor 65 is reduced by a given amount.

If in this arrangement, like in the arrangement described in copending U.S. Pat. application S.N. 757,018 the attenuation factor $\alpha$ of the subsequent sections of the networks 64 is made equal to $\alpha = 2.e^{T_1/R_1C_1}$, where $T_1$ represents the time interval between two successive pulses of a code group, $C_1$ the capacitance of the capacitor 65 and $R_1$ the input resistance of the laddered network, and if the time constant $R_2C_2$ of the reference voltage generator 84, where $R_2$ represents the value of the resistor 85 and $C_2$ that of capacitor 86, is chosen so that the voltage at the capacitor 86 has decreased in the time interval between two successive pulses of a code group by a factor of $2.e^{T_1/R_1C_1}$, the code groups characterizing the speech signals to be transmitted are derived from the output of the pulse modulator 90, the weights of the subsequent pulses of these code groups decreasing by a factor of 2. Upon the first pulse of a code group, the reference voltage V of the reference voltage generator 84 should be equal to the decrease in voltage at the capacitor 65 produced by this pulse through the parallel branch 72 and, as already stated in copending U.S. Pat. application S.N. 757,018, this voltage V, measured in coding units E, is equal to the weight of a pulse of maximum weight. In the embodiment shown, in which the code groups comprise five pulses, this voltage V is $2^4$ E.

According to the invention, like in FIG. 3, the output of the pulse modulator in this arrangement is connected to the control circuit 24 comprising the gate 25, which is opened by the control pulse generator only upon the occurrence of a pulse of maximum weight of a code group, and the subsequent integrating network 26 for producing the control voltage which controls in reverse control the coding unit of the analogue-to-digital converter. The control circuit of the analogue-to-digital converter, i.e. the circuit of the pulse commutator 76, and the circuit of the direct voltage source 87 to the network of the reference voltage generator 84 comprising the resistor 85 and the capacitor 86 for this purpose include amplitude modulators 92, 93 which are controlled simultaneously by the control voltage of the integrating network 26. Through resistors 94, 95, a constant reference voltage is applied as a modulation voltage to each of the amplitude modulators 92, 93.

When using the steps described, the reference voltage V of the reference voltage generator 84 upon the occurrence of the first pulse of a code group and also the decrease in voltage at the capacitor 65 produced by this pulse through the parallel branch 72 have the same value as the output voltage of the integrating network 26 and also as the coding unit, since, as stated above, the said voltage is equal to $2^4$ E.

Like in FIG. 3, in this arrangement the coding process is effected with a coding unit which is substantially directly proportional to the level signal, while the number of pulses of maximum weight of the code groups occurring per unit time characterizes the level signal.

Like in FIG. 4, in the receiver shown in FIG. 11, the pulses derived from the pulse-regenerator 10 are applied on the one hand to the digital-to-analogue converter and on the other hand to the control circuit 33 which controls in forward control the decoding unit of the digital-to-analogue converter.

The digital-to-analogue converter shown includes a network 96 comprising a capacitor 92 and a laddered network connecting thereto and including a terminal resistor 98 and four sections comprising series resistors 99, 100, 101, 102 and parallel resistors 103, 104, 105, while like in the transmitter of FIG. 10 the attenuation factors of the successive sections to the capacitor 97 are made equal to $\alpha$ by rendering both the series resistors 99, 100, 101, 102 and the parallel resistors 103, 104, 105 equal to each other. In particular, the attenuation factors of the successive sections are made equal to $\alpha = 2.e^{T_1/R_1C_1}$, where $T_1$ represents the time interval between two successive pulses of a code group, $R_1$ the input resistance of the laddered network and $C_1$ the capacitance of capacitor 97.

To the ends of the sections of the laddered network are connected five parallel branches 106, 107, 108, 109, 110 each of which includes a normally closed current source which is opened by pulses from a commutator 111 controlled by the control pulse generator 13 through output conductors 112, 113, 114, 115, 116, as a result of which the charge of capacitors 97 increases by a given amount. The parallel branches 106, 107, 108, 109, 110 are constructed in quite the same manner as in the transmitter of FIG. 10; in particular, each of the parallel branches 106, 107, 108, 109, 110 includes a transistor, a reverse voltage being applied through a resistor to the base of each transistor and each base being connected to an output conductor 112, 113, 114, 115, 116 of the commutator 111, while the collectors of the transistors are connected to the network 96 and the transistors have a common emitter resistor 117.

If in the digital-to-analogue converter shown so far the pulses of the incoming code groups are distributed by the commutator 111 over the five output conductors 112, 113, 114, 115, 116, which pulses cause the normally closed current sources in the respective parallel branches 106, 107, 108, 109, 110 to be opened, as has been described in copending U.S. Pat. application S.N. 757,018 at the end of a code group, a voltage will appear at the capacitor 97 which represents the analogue signal characterized by the relevant code group and which is applied to the sampler 14 in order to be reproduced in the reproduction device 18. The decoding unit is determined by the value of the pulses applied through the output conductors 112, 113, 114, 115, 116 of the commutator 111 to the parallel branches 106, 107, 108, 109, 110.

According to the invention, the control circuit 33 of this arrangement comprises, like in FIG. 4, the gate 34 which is opened only upon the occurrence of a pulse of maximum weight of a code group, and the subsequent integrating network 35 for producing the control voltage which is applied for controlling the decoding unit to an amplitude modulator 118 included in the control circuit from the digital-to-analogue converter to the commutator 111. A constant reference voltage is applied as a modulation voltage through a resistor 119 to the amplitude modulator 118.

When using the steps described, the value of the pulses applied to the parallel branches varies with the value of the output voltage of the integrating network and hence also with the decoding unit, since the decoding unit is determined by the value of the pulses applied to the parallel branches. Thus, speech signals transmitted by pulse code modulation by the transmitter of FIG. 10 are recovered, while, as has been described with reference to FIG. 4, not only an excellent reproduction quality but also a considerable reduction of the quantization noise is obtained when compared with the known pulse-code modulation transmission systems.

As has been described with reference to FIG. 4, this reduction of the quantization noise is of particular advantage in time-multiplex transmission; for with unchanged quantization noise, the transmission capacity can be considerably raised, since two pulses per code group can be economized for obtaining the same reproduction quality. Moreover, not only is the transmission capacity raised, but also the analogue-to-digital converter at the transmitter end and the digital-to-analogue converter at the receiver end are simplified, which ultimately results in a considerable simplification of the apparatus.

FIG. 12 shows a time-multiplex transmitter according to the invention and FIG. 13 shows the cooperating time-multiplex receiver.

The time-multiplex transmitter of FIG. 12 is designed for time-multiplex transmission of ten speech channels, of which only two are shown in the FIG., each of the speech channels including a microphone 120 and 220, respectively, a analogue-to-digital network 121 and 221, respectively, an amplifier 122 and 222, respectively, a level voltage generator 123 and 223, respectively, including a rectifier 124 and 224, respectively, and a low-pass filter 125 and 225, respectively, the output voltage of which is combined in a combination device 126 and 226, respectively, with the output voltage of the amplifier 122 and 222, respectively. Each of the time-multiplex channels is connected in the rhythm of the code groups to be produced, for example, at a repetition frequency of 8 kc/s, by means of a commutator 127 to the input of an analog-to-digital converter 128, while the code groups produced by the analogue-to-digital converter 128 are transmitted on the one hand, after being amplified in an output amplifier 129, through a line 130 and are applied on the other hand to a control circuit 131 which controls in reverse control the value of the coding unit in accordance with the level of the speech signal in the relevant time-multiplex channel.

For this purpose, the control circuit 131 includes a gate 132 which is opened by gate pulses upon the occurrence of each pulse of maximum weight of the code groups, a commutator 133 which distributes these pulses over a number of integrating networks 134 and 234, respectively, corresponding to the number of speech channels, which control through a further commutator 135 the relevant coding unit in the analogue-to-digital converter 128. As shown in the FIG., this is achieved by including in a control circuit 136 of the analogue-to-digital converter 128 an amplitude modulator 137 to which through a resistor 138 a constant reference voltage is applied as a modulation voltage.

In order to ensure accurate ganging of the commutators 127, 133, 135, opening of the gate 132 and the analogue-to-digital conversion, these arrangements are controlled by a common control pulse generator 139. The gate pulses for the gate 132 are derived from a frequency multiplier 140 fed by the control pulse generator 139.

FIG. 13 shows the receiver cooperating with the transmitter of FIG. 12.

The code groups transmitted in time-multiplex and entering through the line 130 are applied, after pulse regeneration in a pulse regenerator 141, to a digital-to-analogue converter 142, the output signals of the digital-to-analogue converter 142 being distributed by means of a commutator 143 over ten receiving channels, only two of which are shown in the FIG. Each of these receiving channels includes an amplifier 144 and 244, respectively, an integrating network 145 and 245, respectively, and a low-pass filter 146 and 246, respectively, the output signals of which are applied to a reproduction device 147 and 247, respectively.

The code groups derived from the pulse regenerator 141 are applied to a control circuit 148 which controls in forward control the decoding unit associated with the signal level of a given time-multiplex channel. The control circuit 148 is constructed in quite the same manner as the control circuit 131 at the transmitter end; in particular, the control circuit 148 includes a gate 149 which is opened by a gate pulse upon the occurrence of each pulse of maximum weight of the code groups, a commutator 150 to which are connected a number of integrating networks 151 and 251, respectively, corresponding to the number of time-multiplex channels, a further commutator 152 connected to an amplitude modulator 154 included in the control circuit 153 of the digital-to-analogue converter 142, a constant reference voltage being applied as a modulation voltage through a resistor 155 to the amplitude modulator 154. Like in the transmitter, the commutators 143, 150, 152, the control circuit 153 of the digital-to-analogue converter 142 and the gate 149 are controlled through a frequency multiplier 156 by a common control pulse generator 157 which is accurately ganged with the control pulse generator 139 at the transmitter end in known manner, for example, by a synchronizing pulse transmitted simultaneously.

Thus, it is ensured that the digital-to-analogue conversion in the digital-to-analogue converter 142 of each of the time-multiplex channels is effected with the aid of the decoding unit associated with the relevant channel and the reproduction quality and the signal-to quantization noise ratio are materially improved without an increase in the susceptibility to interferences while avoiding the occurrence of nonlinear distortions. FIGS. 10 and 11 illustrate the simple manner in which the invention can be applied to time-multiplex apparatus. It should be noted that it may be of advantage when the integrating networks 134, 234 and 151, 251, respectively, are constructed by digital techniques.

Finally, it should be noted that the transmission system according to the invention is distinguished by its flexibility for transmitters and receivers of different types can cooperate without resulting in a decrease of the transmission quality.

We claim:

1. A pulse code modulation system for the transmission of analogue signals from a transmitting terminal to a receiving terminal, comprising at said transmitting terminal, analogue signal input means, level signal generating means for producing signals characterizing the analogue signals, pulse generating means for producing control pulses, sampling means activated by said control pulses for providing successive signal increments from the output signals of said level signal generating means, analogue-to-digital converting means for coding the output signals from said sampling means to produce groups of pulses having different weights, compression control means for providing additional coding of the code groups produced by said analogue-to-digital converting means, means for transmitting the pulse code groups to the receiving means, and comprising at said receiving means, pulse regenerating means for processing the pulses in the code groups, digital-to-analogue converting means having characteristics of said analogue-to-digital converting means in the transmitter, said digital-to-analogue converting means for producing decoded signals from the pulses in the coded groups being supplied from said pulse regenerating means, expansion control means having characteristics mutually reciprocal to the characteristics of said compression control means in the transmitter, said expansion control means controlling said digital-to-analogue converting means, pulse generating means to produce control pulses in synchronism with the control pulses of the transmitter, commutating means activated by the control pulses of said pulse generating means for synthesizing the decoded signals from said digital-to-analogue converting means, and reproduction means for producing from the decoded signals analogue signals identical to the analogue signals supplied to the transmitter.

2. A pulse code modulation system as claimed in claim 1, wherein said level signal generating means comprises a combination device in parallel with a series circuit consisting of a rectifier and a low-pass filter.

3. A pulse code modulation system as claimed in claim 7, wherein said level signal generating means comprises a full wave rectifier for providing analogue signal levels to said sampling means and pulse means for characterizing polarity of the analogue signals to be transmitted by simultaneously combining polarity signals with the coded groups prior to transmission.

4. A pulse code modulation system as claimed in claim 1, wherein said level signal generating means comprises integrating means supplied by the control pulses of said pulse generating means, and amplitude modulating means for controlling the output of said integrating means.

5. A pulse code modulating system as claimed in claim 1, wherein the compression control means comprises gating means activated by said pulse generating means to pass a number of pulses of the coded groups produced by said analogue-to-digital converting means, integrating means for producing voltages from the pulses passed by said gating means, comparator means for comparing the voltage of said integrating means with a reference signal to produce dynamic compression control voltages inversely proportional to the integrated voltage, analogue-to-digital converter control means to produce coding pulses from the control pulses of said pulse generating means, and amplitude modulating means controlled by the control voltage from said comparator means to vary the amplitude of the coding pulses supplied to said analogue-to-digital converting means and produce from said analogue-to-digital converting means coded groups of pulses of different weights, the presence or absences of said pulses being directly proportional to the number of pulses passed by said gating means.

6. A pulse code modulation system as claimed in claim 1, wherein the expansion control means comprises gating means activated by said pulse generating means to a number of pulses of the coded groups from said pulse regenerating means, integrating means for producing voltages passed by said gating means, comparator means for comparing the voltage of said integrating means, with a reference signal to produce dynamic expansion control voltages inversely proportional to the integrated voltage, digital-to-analogue converter control means to produce coding pulses from the control pulses of said pulse generating means and amplitude modulating means controlled by the control voltage from said comparator means to vary the amplitude of the coding pulses supplied to said digital-to-analogue converting means and produce from said digital-to-analogue converting means signals with characteristics determined by the coded groups of pulses from said pulse regenerating means.

7. A pulse code modulation system as claimed in claim 1, wherein the analogue-to-digital converting means comprises a capacitor charged by the output signals from said sampling means, a ladder network of resistors connected to said capacitor to provide weight factors for the pulses, reference voltage generating means controlled by said pulse generating means, for comparing the voltage on said capacitor with the voltage from said reference voltage generating means to provide difference voltages, frequency multiplying means for increasing the frequency of the pulses from said pulse generating means and pulse modulating means for modulating the output pulses of said frequency multiplier in accordance with the magnitude and polarity of the difference voltage from said comparing means to produce coded groups of pulses having different weights.

8. A pulse code modulation system as claimed in claim 1, wherein said analogue-to-digital converting means further comprises pulse duration modulating means to provide pulses of varying duration characterizing the output pulses from said sampling means, frequency multiplying means for increasing the frequency of the control pulses from said pulse generating means, gating means controlled by the varying pulses of said pulse duration modulator to pass the pulses from said frequency multiplying means and digital means to produce coded groups of pulses from the output of said gating means for transmission.

9. A pulse code modulation system as claimed in claim 1, wherein the digital-to-analogue converting means comprises a capacitor, a ladder network of resistors connected to said capacitor to provide weight factors for the pulses, a plurality of normally closed current sources connected to the parallel branches of said ladder network to increase the charge on said capacitor by a given amount, and commutating means controlled by said pulse generating means for controlling said normally closed current sources in proportion to the number of pulses in the coded groups from said pulse regenerating means.

10. A pulse code modulation system as claimed in claim 1, wherein said pulse regenerative means comprises gating means supplied with said coded groups of pulses to suppress pulses of opposite polarity from said digital-to-analogue converting means, and provide means for controlling the polarity of the output of said digital-to-analogue converting means.

11. A pulse code modulation system as claimed in claim 1, further comprising a plurality of signal processing and level signal generating channels, a plurality of compression control means equal to the number of said channels, and commutating means for providing time-multiplex operation of said analogue-to-digital converting means.

12. A pulse code, modulation system as claimed in claim 1, further comprising a plurality of expansion control means, commutating means for providing time-multiplex operation of said digital-to-analogue converting means to a plurality of reproduction means equal to the number of expansion control means.

13. A pulse code modulation system as claimed in claim 5, wherein the compression control means further comprises a plurality of gating means, and an equal number of integrating means for operation with said gating means.

14. A pulse code modulation system as claimed in claim 5, wherein said integrating means comprises a first section having a cutoff frequency of the order of the low frequency of the output signal from said sampling means.

15. A pulse code modulation system as claimed in claim 6, wherein said expansion control means further comprises a plurality of gating means, and an equal number of integrating means for operation with said gating means.

16. A pulse code modulation system as claimed in claim 7, wherein said analogue-to-digital converting means further comprises commutating means controlled by said pulse generating means, and a plurality of normally closed current sources connected between said commutating means and the parallel branches of said ladder network and controlled by said commutating means to reduce the charge on said capacitor by a given amount.

17. A pulse code modulation system as claimed in claim 13, wherein said integrating means further comprises a second section connected in cascade with said first section, said second section having a cutoff frequency higher than that of said first section but not exceeding the low frequency of the output signal from said sampling means.